(12) United States Patent
Archer

(10) Patent No.: US 7,156,994 B1
(45) Date of Patent: Jan. 2, 2007

(54) DRINKING WATER FILTER USED WITH TAP WATER AND OTHER WATER SOURCES

(76) Inventor: Virgil L. Archer, P.O. Box 4146, Englewood, CO (US) 80155

( * ) Notice: Subject to any disclaimer, the term of this patent is extended or adjusted under 35 U.S.C. 154(b) by 0 days.

(21) Appl. No.: 11/241,153

(22) Filed: Sep. 30, 2005

(51) Int. Cl.
*B01D 27/02* (2006.01)
*B01D 27/14* (2006.01)

(52) U.S. Cl. ................................. 210/266; 210/282

(58) Field of Classification Search ............... 210/266, 210/282
See application file for complete search history.

(56) References Cited

U.S. PATENT DOCUMENTS

| | | | | |
|---|---|---|---|---|
| 5,753,107 | A | * | 5/1998 | Magnusson et al. ......... 210/109 |
| 6,197,193 | B1 | * | 3/2001 | Archer ........................ 210/266 |
| 2002/0195407 | A1 | * | 12/2002 | Levy ........................... 210/767 |

* cited by examiner

*Primary Examiner*—Ivars C. Cintins
(74) *Attorney, Agent, or Firm*—Edwin H. Crabtree; Ramon L. Pizarro

(57) ABSTRACT

A drinking water filter for filtering major water contaminates from tap water and other drinking water sources. The water filter a cylindrical cartridge for receiving a plurality of sponge filters used as dividers between different layers of filtration material and along a length of the cartridge. The sponge filters are designed to remove large and small sediments in the water from 1 to 100 microns in size and greater when the water is introduced through the cartridge. The layers of filtration material includes a layer of granulated zinc and copper alloy, a fine mesh carbon block, a layer of granulated ion exchange resin, a layer of granulated activated carbon and layer of granulated activated calcite. The carbon block and the granulated carbon material is used for removing chlorine, odor, color, cysts, protozoa and organic contaminants such as pesticides, herbicides, arsenic, mercury, and trihalomnethanes. The zinc and copper alloy is used for removing chlorine and heavy metals in the water and reducing bacteria in the water. The calcite is used to raise the pH in the filtered water when the pH is below neutral.

10 Claims, 1 Drawing Sheet

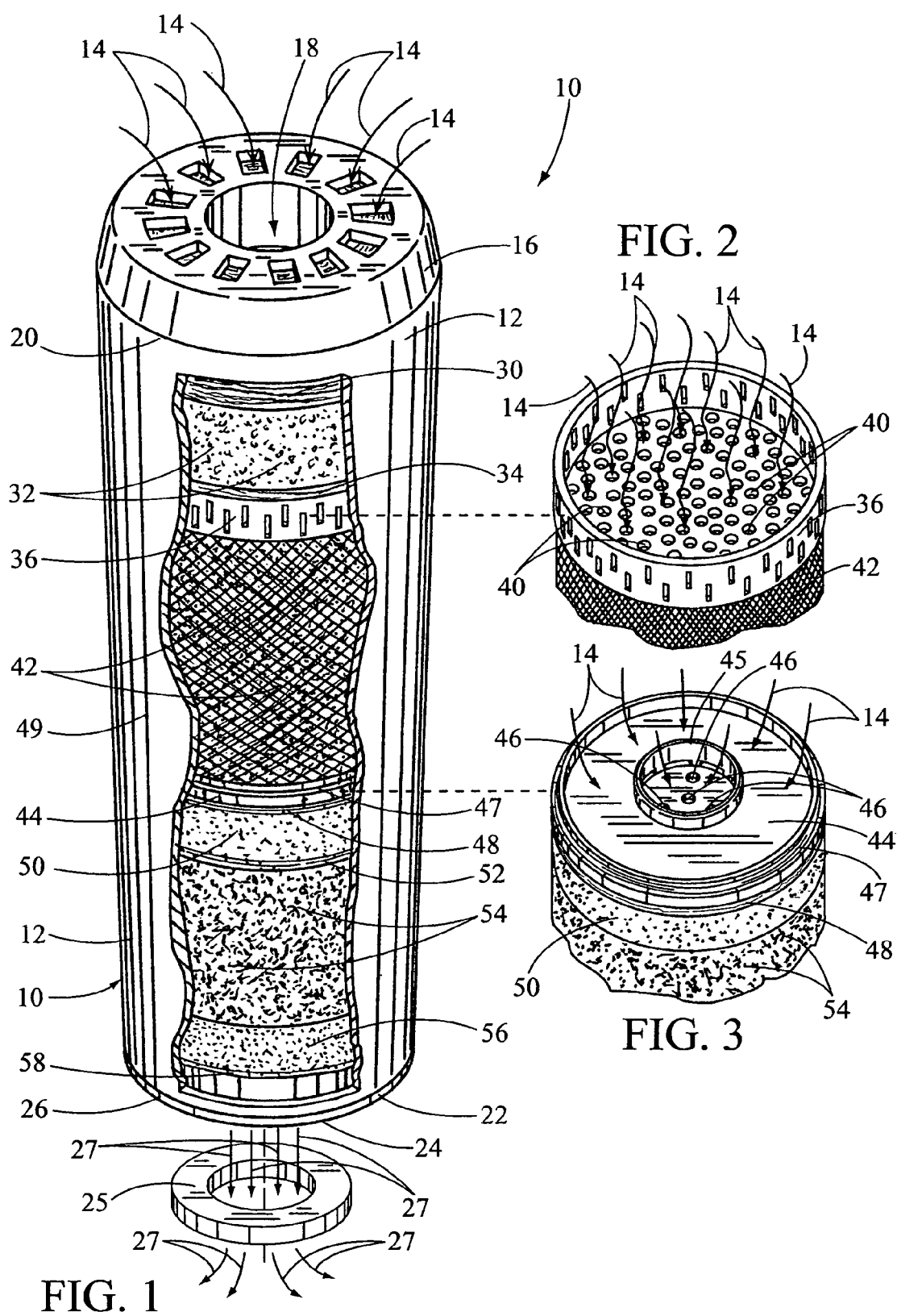

DRINKING WATER FILTER USED WITH TAP WATER AND OTHER WATER SOURCES

BACKGROUND OF THE INVENTION (a) Field of the Invention

This invention relates to water filtration and more particularly, but not by way of limitation, to an improved water filter used for filtering major water contaminates from tap water from a municipal water supply and other water sources. The filtered tap water is used for drinking, cooking, washing and other household uses.

(b) Discussion of Prior Art

In U.S. Pat. No. 6,197,193 to the inventor of the subject patent application, a similar water filter is described having a cylindrical hollow filter cartridge with a combination of filter pads, a layer of granulated zinc and copper alloy, a layer of granulated activated carbon, a layer of ion exchange resin and a layer of granulated calcite. The subject water filter is a substantial improvement over the water filter described in this patent.

In U.S. Pat. No. 753,780 to Woods, a water filter is described and used with a hand pump for pumping water from a water well. The filter includes a series of perforated plates, layers of sand, charcoal and sponges. In U.S. Pat. No. 4,913,808 to Haque, an interchangeable water purification system is disclosed having a cartridge with layers of activated carbon and a layer of ion exchange resin. In U.S. Pat. No. 5,643,444 to Garrigues et al., U.S. Pat. No. 5,252,206 to Gonzales, U.S. Pat. No. 4,368,123 to Stanley and U.S. Pat. No. 5,685,981 to Koslow, different types of water filters, counter top water conditioners and filtration cartridges are described.

None of the above-mentioned prior art patents specifically disclose or teach the unique features and advantages of the subject drinking water filter used with a tap water supply as described herein.

SUMMARY OF THE INVENTION

In view of the foregoing, it is a primary objective of the subject invention to provide an improved water filter used for various household uses. Also, the water filter can be used for commercial and industrial applications where treated drinking, cooking and washing water is desired or required. The water filter provides a consumer with protection against major water contaminants found in municipal water supplies and other drinking water sources.

Another object of the invention is the water filter removes contaminants in the water to below E.P.A. recommended minimum levels.

Yet another object of drinking water filter is the filter is designed to remove large and small sediments in the water. Also the filter, using a combination of a carbon block and a layer of granulated activated carbon, removes chlorine, trihalomethanes, hydrogen sulfide, pesticides, herbicides, toxic heavy metals (such as lead, organic mercury, organic arsenic and others), cysts, protozoa (including *giardia* and *cryptosporidium*), cancer-causing organic pollutants, microorganisms and other foreign particles and organisms. The filter gives treated water a sparkling clarity by screening material out of the water down to a one micron size.

A further object of the invention is the filter is designed to raise the water's pH when the pH is below neutral, thereby lowering acidity and increasing alkalinity, which is recommended by many nutritionists.

Still further, the water filter requires no plumbing and is received in a filter housing attached to a standard water faucet. The filter housing can be disposed on a counter top for household use. Also, the water filter housing can be attached to a water supply line and mounted under a kitchen sink.

The subject water filter costs pennies per gallon, is compact and space saving in design. It eliminates the need to buy, lift and carry heavy water bottles. The water filter has a filter life of treating 1500 gallons of tap water, which is a typical one year average drinking and cooking water use of a family of four. The water filter includes a replaceable filter cartridge, which can be quickly and easily replaced.

The improved drinking water filter includes a cylindrical hollow filter cartridge for receiving a number of water filter layers therein. The filter cartridge is adapted for receipt in a water filter housing connected to a water supply source such as a municipal water supply tap.

The filter cartridge includes an upper filter cap with water inlet adapted for fluid communication with a tap water supply. The upper filter cap is received inside an open top portion of the cartridge. The cartridge also includes a lower filter cap with a water outlet. The lower filter cap is received inside an open bottom portion of the cartridge.

The filter cartridge also includes a plurality of sponge filters, which may be used as dividers between different layers of filtration material and along a length of the cartridge. The sponge filters are designed to remove large and small sediments in the water from 1 to 100 microns in size and greater when the water is introduced through the cartridge.

In an upstream upper portion of the cartridge is a 100 first micron sponge filter received on top of a layer of granulated zinc and copper alloy. The zinc and copper alloy is known a brand name of KDF-55. The zinc and copper alloy is used for removing chlorine and some heavy metals in the water. Also, the alloy is an excellent bacteriostat for reducing bacteria in the water. A 10 micron second sponge filter is disposed below the layer of granulated zinc and copper alloy and on top of a first filter cap with an "O" ring therearound.

The first filter cap includes a plurality of holes therein for funneling water down alongside the 0.5 micron ultra fine mesh coconut shell carbon block The water pressure then forces the water through the sides of the block. The carbon block is a key feature of the water filter and is used for removing chlorine, odor and color from the water being filtered, cysts and protozoa. Also, the carbon block removes organic contaminants such as pesticides, herbicides, arsenic, mercury, and trihalomnethanes, a cancer-causing organic pollutant.

A second filter cap with a plurality of holes centered inside an inner ring on the cap is disposed next to the bottom of the carbon block. The second filter cap is designed to make sure all of the water is channeled through the carbon block and none escapes without being filtered through the block.

A 10 micron third sponge filter is disposed next to the bottom of the second filter cap and on top of a layer of granulated ion exchange resin. The ion exchange resin has an exceptional affinity for lead and removes this contaminant to below E.P.A. federal standards.

A 10 micron fourth sponge filter is disposed next to the bottom of the ion exchange resin and on top of a layer of granulated activated carbon. The granulated activated carbon is also used to removing chlorine, odor, color, cysts, protozoa and organic contaminants such as pesticides, herbicides, arsenic, mercury, and trihalomnethanes.

A layer of granulated calcite is disposed below the layer of granulated activated calcite. The calcite is used to raise the pH of the filtered water when the pH is below neutral. This feature lowers the acidity of the water and increases the alkalinity.

A 1 micron filter pad is disposed below the layer of granulated calcite and next to the lower filter cap with water outlet. The 1 micron filter pad screens out any remaining microscopic contaminants and gives the filtered water a sparkling clarity.

These and other objects of the present invention will become apparent to those familiar with various types of drinking water filters and water purifying systems when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the principles thereof, and in which:

FIG. 1 is a perspective view of the improved drinking water filter with the filter cartridge in an upright position. A portion of the cartridge housing has been cutaway to expose and illustrate the various granular filter materials and carbon block used in filtering the water to be treated. Arrows are shown at the top of the cartridge to illustrate the incoming unfiltered water. Also, arrows are shown at the bottom of the filter cartridge illustrating the treated water being discharged from the filter cartridge.

FIG. 2 is a perspective view of the first filter cap disposed on top of the carbon block and the migration of the water being treated through the first filter cap.

FIG. 3 is a perspective view of the second filter cap with cap ring and holes for directing the water from the carbon through the center of the second filter cap.

DETAILED DESCRIPTION OF THE PREFERRED EMBODIMENTS

In FIG. 1, the subject improved drinking water filter is shown having general reference numeral 10. The drinking water filter 10 includes a cylindrical hollow filter cartridge 12 adapted for receipt in a water filter housing connected to a water supply source such as a municipal water supply tap and other drinking water sources. The water filter housing is not shown in the drawings. The water to be treated is shown as arrows 14.

The filter cartridge 12 includes an upper filter cap 16 with water inlet 18 adapted for fluid communication with the water 14. The upper filter cap 16 is received inside an open top portion 20 of the cartridge 12. The cartridge 12 also includes a lower filter cap 22 with a water outlet 24. A rubber gasket 25 surrounds the side of the water outlet 24 to prevent leakage as the treated water, shown as arrows 27, exits the water filter 10. The lower filter cap 22 is received inside an open bottom portion 26 of the cartridge 12. In this drawing, the cartridge 12 has been cutaway along it's length to illustrate the following described filters and filter layers found therein.

In an upstream upper portion 28 of the cartridge 10 is a 100 micron first sponge filter 30 received on top of a layer of granulated zinc and copper alloy 32. The zinc and copper alloy 32 is known by a brand name of KDF-55. The zinc and copper alloy 32 is used for removing chlorine and some heavy metals in the water. Also, the alloy is an excellent bacteriostat for reducing bacteria in the water. A 10 micron second sponge filter 34 is disposed below the layer of granulated zinc and copper alloy 32 and on top of a first filter cap 36.

The first filter cap 36 includes a plurality of holes 40 therein, as shown in FIG. 2. The water 14 is now funneled down the sides of a 0.5 micron ultra fine mesh coconut shell carbon block 42 and forced through the sides of the block so that the water is channeled through the carbon block 42. The carbon block 42 is used for removing chlorine, odor, color, cysts and protozoa. Also, the carbon block 42 removes organic contaminants such as pesticides, herbicides, arsenic, mercury, and trihalomnethanes, a cancer-causing organic pollutant.

A second filter cap 44 with a plurality of holes 46 inside and around an inner ring 45 on the cap is disposed next to the bottom of the carbon block 42. These features are shown more clearly in FIG. 3. The second filter cap 44 is designed to contain the water so that no water escapes being forced into the carbon block. All of the water is forced through the carbon block 42 and pushed toward the center of the cap 44. The filter cap 44 further includes an "O" ring 47 received around it's outer circumference.

In a center portion 49 of the hollow cartridge 12 is a 10 micron third sponge filter 48. The third filter 48 is disposed next to the bottom of the second filter cap 44 and on top of a layer of granulated ion exchange resin 50. The ion exchange resin 50 has an exceptional affinity for lead and removes this contaminant to below E.P.A. federal standards.

A 10 micron fourth sponge filter 52 is disposed next to the bottom of the ion exchange resin 50 and on top of a layer of granulated activated carbon 54. The granulated activated carbon 54 provides added protection in removing chlorine, odor, color, and organic contaminants such as pesticides, herbicides, arsenic, mercury, and trihalomnethanes.

A layer of granulated calcite 56 is disposed below the layer of granulated activated carbon 54. The calcite 56 is used to raise the pH of the filtered water. This feature lowers the acidity of the water and increases the alkalinity of the treated drinking water.

A 1 micron final filter pad 58 is disposed below the layer of granulated calcite 56 and next to the lower filter cap 22 with water outlet 24. The 1 micron filter pad 58 provides added protection by screening out remaining microscopic contaminates and gives the filtered water a sparkling clarity.

In FIG. 2, a perspective view of the first filter cap 36 is shown disposed on top of a portion of the carbon block 42. In this drawing, the water 14, being treated, is shown being circulated through the holes 40 in the filter cap 36.

In FIG. 3, a perspective view of the second filter cap 44 is shown on top of the third sponge filter 48 received on top of a portion of the ion exchange resin 50. The holes 46 inside the inner cap ring 45 of the second filter cap 44 are used for directing the treated water toward the center and lower portion of the carbon block 42 prior to exiting the carbon block and through the third sponge filter 48 and the ion exchange resin 50.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right is claimed are defined as follows:

1. A drinking water filter adapted for receipt in a water filter housing and connected to a water supply source for treating drinking water, the water filter comprising:
    a hollow filter cartridge, said cartridge including an upper filter cap with water inlet adapted for fluid communication with the drinking water to be treated, said upper filter cap received inside an open top portion of said cartridge, said cartridge also including a lower filter cap with a water outlet, said lower filter cap received inside an open bottom portion of said cartridge;
    a first sponge filter, said first sponge filter disposed below said upper filter cap;
    a layer of granulated zinc and copper alloy, said layer of zinc and copper alloy disposed below said first sponge filter, said layer of zinc and copper alloy used for removing chlorine and heavy metals in the water and reducing bacteria in the water;
    a second sponge filter, said second sponge filter disposed below said layer of granulated zinc and copper alloy;
    a first filter cap, said first filter cap disposed below said second sponge filter, said first filter cap having a plurality of holes therein;
    an ultra fine mesh carbon block, said carbon block disposed below said first filter cap for receiving water therefrom, said carbon block used for removing chlorine, odor, color, cysts, protozoa and organic contaminants such as pesticides, herbicides, arsenic, mercury, and trihalomnethanes;
    a second filter cap, said second filter cap disposed below said carbon block, said second filter cap having an outer ring disposed next to a portion of an inside of said hollow filter cartridge, said second filter cap having a inner ring centered thereon, said inner ring having a plurality of holes centered therein, whereby said second filter cap designed to channeled the water from said carbon block into said inner ring and through said holes centered therein;
    an "O" ring disposed around a circumference of said outer ring of said second filter cap and engaging a portion of an inside of said filter cartridge, said "O" ring preventing the migration of water around a side of said carbon block and around a side of said second filter cap;
    a third sponge filter, said third sponge filter disposed below said second filter cap;
    a layer of granulated ion exchange resin, said layer of ion exchange resin disposed below said third sponge filter, said layer of ion exchange resin used for removing lead from the water;
    a fourth sponge filter, said fourth sponge filter disposed below said layer of ion exchange resin;
    a layer of granulated activated carbon, said layer of granulated activated carbon disposed below said fourth sponge filter, said layer of granulated activated carbon used to remove any remaining chlorine, odor, color, and organic contaminants in the water;
    a layer of granulated calcite, said layer of granulated calcite disposed below said layer of granulated activated carbon, said layer of granulated calcite used to raise the pH of the filtered water; and
    a final filter pad, said final filter pad disposed below said layer of granulated calcite and on top of said lower filter cap with water outlet.

2. The water filter as described in claim 1 wherein said first sponge filter is a 100 micron first sponge filter.

3. The water filter as described in claim 1 wherein said second sponge filter is a 10 micron second sponge filter, said third sponge filter is a 10 micron third sponge filter and said fourth sponge filter is a 10 micron fourth sponge filter.

4. The water filter as described in claim 1 wherein said carbon block is a 0.5 micron ultra fine mesh coconut shell carbon block.

5. The water filter as described in claim 1 wherein said final filter pad is a 1 micron final filter pad.

6. A drinking water filter adapted for receipt in a water filter housing and connected to a water supply source for treating drinking water, the water filter comprising:
    a hollow filter cartridge, said cartridge including an upper filter cap with water inlet adapted for fluid communication with the drinking water to be treated, said upper filter cap received inside an open top portion of said cartridge, said cartridge also including a lower filter cap with a water outlet, said lower filter cap received inside an open bottom portion of said cartridge;
    a first sponge filter, said first sponge filter disposed below said upper filter cap;
    a layer of granulated zinc and copper alloy, said layer of zinc and copper alloy disposed below said first sponge filter, said layer of zinc and copper alloy used for removing chlorine and heavy metals in the water and reducing bacteria in the water;
    a second sponge filter, said second sponge filter disposed below said layer of granulated zinc and copper alloy;
    a first filter cap, said first filter cap disposed below said second sponge filter, said first filter cap having a plurality of holes therein;
    an 0.5 micron ultra fine mesh carbon block, said carbon block disposed below said first filter cap for receiving water therefrom, said carbon block used for removing chlorine, odor, color, cysts, protozoa and organic contaminants such as pesticides, herbicides, arsenic, mercury, and trihalomnethanes;
    a second filter cap, said second filter cap disposed below said carbon block, said second filter cap having an outer ring disposed next to a portion of an inside of said hollow filter cartridge, said second filter cap having a inner ring centered thereon, said inner ring having a plurality of holes centered therein, whereby said second filter cap designed to channeled the water from said carbon block into said inner ring and through said holes centered therein;
    an "O" ring disposed around a circumference of said outer ring of said second filter cap and engaging a portion of an inside of said filter cartridge, said "O" ring preventing the migration of water around a side of said carbon block and around a side of said second filter cap;
    a third sponge filter, said third sponge filter disposed below said second filter cap;
    a layer of granulated ion exchange resin, said layer of ion exchange resin disposed below said third sponge filter, said layer of ion exchange resin used for removing lead from the water;
    a fourth sponge filter, said fourth sponge filter disposed below said layer of ion exchange resin;
    a layer of granulated activated carbon, said layer of granulated activated carbon disposed below said fourth sponge filter, said layer of granulated activated carbon used to remove any remaining chlorine, odor, color, and organic contaminants in the water;

a layer of granulated calcite, said layer of granulated calcite disposed below said layer of granulated activated carbon, said layer of granulated calcite used to raise the pH of the filtered water; and a final filter pad, said final filter pad disposed below said layer of granulated calcite and on top of said lower filter cap with water outlet.

7. The water filter as described in claim 6 wherein said first sponge filter is a 100 micron first sponge filter.

8. The water filter as described in claim 6 wherein said second sponge filter is a 10 micron second sponge filter, said third sponge filter is a 10 micron third sponge filter and said fourth sponge filter is a 10 micron fourth sponge filter.

9. The water filter as described in claim 6 wherein said final filter pad is a 1 micron final filter pad.

10. A drinking water filter adapted for receipt in a water filter housing and connected to a water supply source for treating drinking water, the water filter comprising:

a hollow filter cartridge, said cartridge including an upper filter cap with water inlet adapted for fluid communication with the drinking water to be treated, said upper filter cap received inside an open top portion of said cartridge, said cartridge also including a lower filter cap with a water outlet, said lower filter cap received inside an open bottom portion of said cartridge;

a 100 micron first sponge filter, said first sponge filter disposed below said upper filter cap;

a layer of granulated zinc and copper alloy, said layer of zinc and copper alloy disposed below said first sponge filter, said layer of zinc and copper alloy used for removing chlorine and heavy metals in the water and reducing bacteria in the water;

a 10 micron second sponge filter, said second sponge filter disposed below said layer of granulated zinc and copper alloy;

a first filter cap, said first filter cap disposed below said second sponge filter, said first filter cap having a plurality of holes therein;

an 0.5 micron ultra fine mesh carbon block, said carbon block disposed below said first filter cap for receiving water therefrom, said carbon block used for removing chlorine, odor, color, cysts, protozoa and organic contaminants such as pesticides, herbicides, arsenic, mercury, and trihalomnethanes;

a second filter cap, said second filter cap disposed below said carbon block, said second filter cap having an outer ring disposed next to a portion of an inside of said hollow filter cartridge, said second filter cap having a inner ring centered thereon, said inner ring having a plurality of holes centered therein, whereby said second filter cap designed to channeled the water from said carbon block into said inner ring and through said holes centered therein;

an "O" ring disposed around a circumference of said outer ring of said second filter cap and engaging a portion of an inside of said filter cartridge, said "O" ring preventing the migration of water around a side of said carbon block and around a side of said second filter cap;

a 10 micron third sponge filter, said third sponge filter disposed below said second filter cap;

a layer of granulated ion exchange resin, said layer of ion exchange resin disposed below said third sponge filter, said layer of ion exchange resin used for removing lead from the water;

a 10 micron fourth sponge filter, said fourth sponge filter disposed below said layer of ion exchange resin;

a layer of granulated activated carbon, said layer of granulated activated carbon disposed below said fourth sponge filter, said layer of granulated activated carbon used to remove any remaining chlorine, odor, color, and organic contaminants in the water;

a layer of granulated calcite, said layer of granulated calcite disposed below said layer of granulated activated carbon, said layer of granulated calcite used to raise the pH of the filtered water; and a 1 micron final filter pad, said final filter pad disposed below said layer of granulated calcite and on top of said lower filter cap with water outlet.

* * * * *